(12) United States Patent
Scatchard

(10) Patent No.: US 7,896,362 B1
(45) Date of Patent: Mar. 1, 2011

(54) SNOW BIKE INCORPORATING A DOUBLE PIVOT SKI ASSEMBLY

(76) Inventor: Brooke Oliver Scatchard, Charlotte, VT (US)

( * ) Notice: Subject to any disclaimer, the term of this patent is extended or adjusted under 35 U.S.C. 154(b) by 1067 days.

(21) Appl. No.: 11/507,216

(22) Filed: Aug. 21, 2006

Related U.S. Application Data

(60) Provisional application No. 60/710,228, filed on Aug. 22, 2005.

(51) Int. Cl.
*B62K 13/00* (2006.01)

(52) U.S. Cl. .................. 280/7.12; 280/7.1; 280/7.14

(58) Field of Classification Search .................. None
See application file for complete search history.

(56) References Cited

U.S. PATENT DOCUMENTS

| | | | |
|---|---|---|---|
| 556,350 A | 3/1896 | Hokanson et al. | |
| 564,306 A * | 7/1896 | Dean | 280/7.14 |
| 800,186 A * | 9/1905 | Vaughan | 280/7.14 |
| 1,068,883 A * | 7/1913 | Frank | 180/185 |
| 1,268,229 A | 6/1918 | Frank | |
| 1,337,396 A | 4/1920 | Eisett | |
| 2,228,538 A * | 1/1941 | Smith | 280/14 |
| 2,492,965 A * | 1/1950 | Carr | 244/108 |
| 3,361,436 A * | 1/1968 | Williams | 280/16 |
| 3,690,639 A * | 9/1972 | Brandon et al. | 267/282 |
| 3,870,329 A * | 3/1975 | Evequoz | 280/16 |
| 3,894,746 A * | 7/1975 | Evequoz | 280/16 |
| 4,027,891 A | 6/1977 | Frame | |
| 4,059,168 A * | 11/1977 | House | 180/183 |
| 4,087,104 A * | 5/1978 | Winchell et al. | 280/210 |
| 4,168,841 A * | 9/1979 | Uhlyarik | 280/7.12 |
| 4,616,949 A * | 10/1986 | Kellner | 403/104 |
| 4,702,346 A * | 10/1987 | Uno et al. | 181/207 |
| 4,804,170 A * | 2/1989 | Young et al. | 267/279 |
| 4,869,336 A * | 9/1989 | Nakasaki et al. | 180/196 |
| 5,022,668 A * | 6/1991 | Kenny | 280/7.14 |
| 5,064,208 A * | 11/1991 | Bibollet | 280/21.1 |
| 5,102,153 A * | 4/1992 | Rhode | 280/7.14 |
| 5,129,873 A * | 7/1992 | Henderson et al. | 482/52 |
| 5,161,655 A * | 11/1992 | Shimoda | 188/371 |
| 5,423,559 A * | 6/1995 | Rhode | 280/12.14 |
| 5,660,406 A * | 8/1997 | Menze, sen. | 280/276 |
| 5,863,051 A | 1/1999 | Brenter | |
| 6,135,476 A * | 10/2000 | Dickie et al. | 280/250.1 |
| 6,192,773 B1 * | 2/2001 | Liao | 74/551.3 |
| 6,416,062 B1 * | 7/2002 | Scatchard | 280/7.14 |
| 6,554,294 B2 * | 4/2003 | Laudon | 280/7.14 |
| 6,626,441 B1 * | 9/2003 | Hanson | 280/7.14 |
| 6,663,117 B2 | 12/2003 | Cheney et al. | |

(Continued)

OTHER PUBLICATIONS http://www.snomobike.com/pages/home.html (Aug. 21, 2006 print out of page attached).

*Primary Examiner* — Terrell McKinnon
*Assistant Examiner* — Chiedu A Chibogu
(74) *Attorney, Agent, or Firm* — Thomas G. Ference

(57) ABSTRACT

The present invention is directed to a kit for converting a bicycle to a snow bike. The kit comprises an upper member, a lower member and a ski. The upper member is configured for attachment to the wheel dropouts of the bike. The upper and lower members are joined together by a first resilient pivot. The lower member and the ski are joined together by a second resilient pivot. Both the first and second resilient pivots rotate about axes parallel to the axis of the wheel dropouts.

18 Claims, 14 Drawing Sheets

U.S. PATENT DOCUMENTS

| | | | |
|---|---|---|---|
| 6,783,133 B1 * | 8/2004 | Araujo | 280/7.14 |
| 6,942,205 B2 * | 9/2005 | Carlstedt et al. | 267/282 |
| 6,994,359 B1 * | 2/2006 | Silver | 280/16 |
| 7,040,634 B1 * | 5/2006 | Elkins, Jr. | 280/14.25 |
| 7,571,913 B2 * | 8/2009 | Cheney et al. | 280/12.14 |
| 2001/0038184 A1 * | 11/2001 | Stafford | 280/14.27 |
| 2002/0011727 A1 * | 1/2002 | Kernan | 280/809 |
| 2005/0205326 A1 | 9/2005 | Patmont et al. | |
| 2005/0263967 A1 * | 12/2005 | Picariello et al. | 280/7.12 |

* cited by examiner

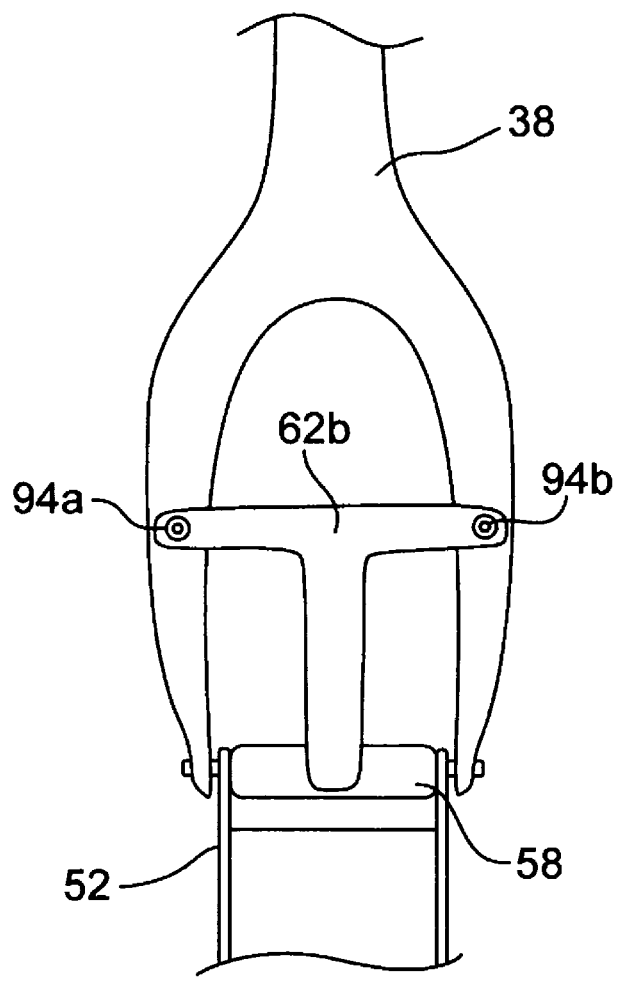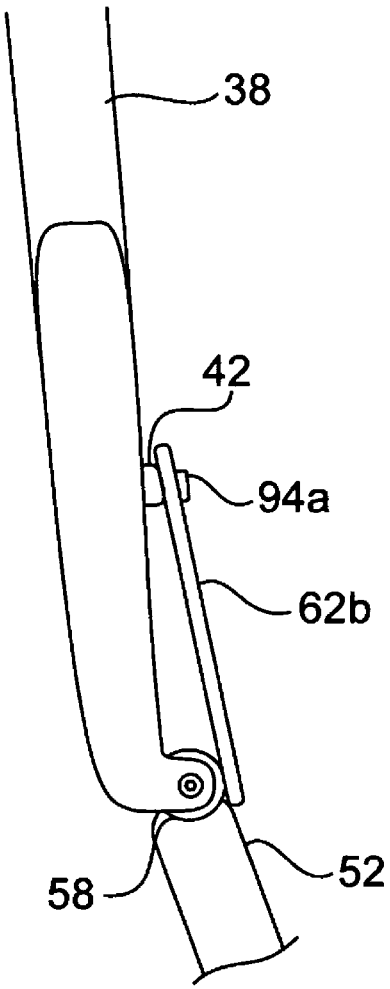
Figure 5a
Figure 5b

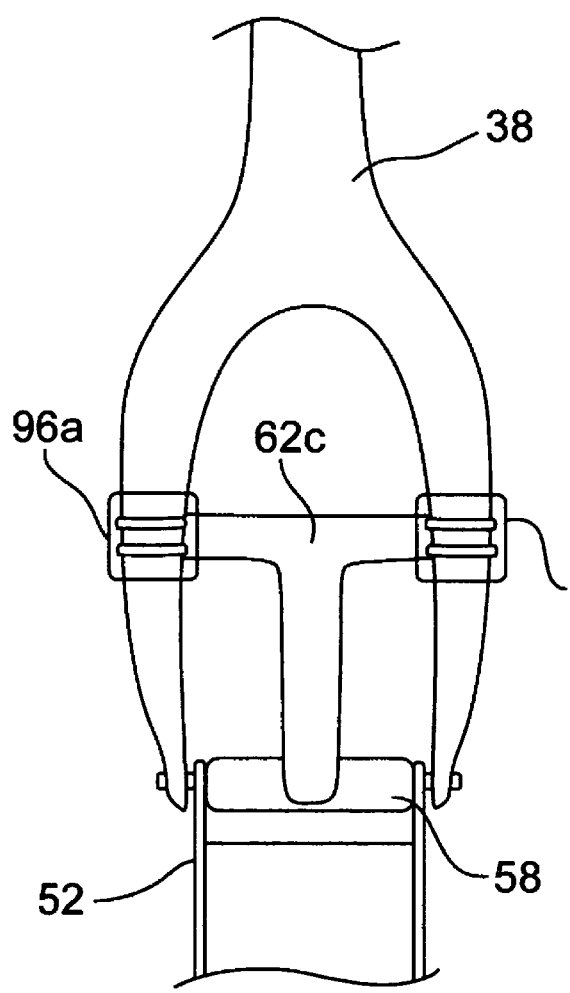
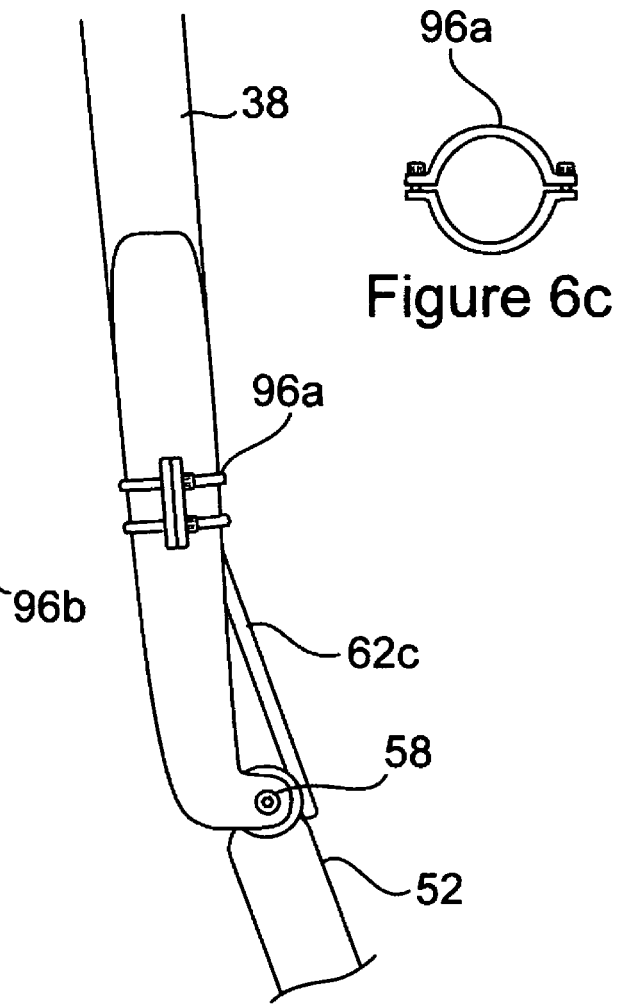
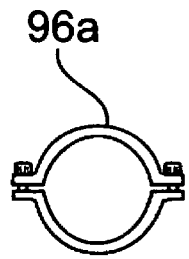
Figure 6a
Figure 6b
Figure 6c

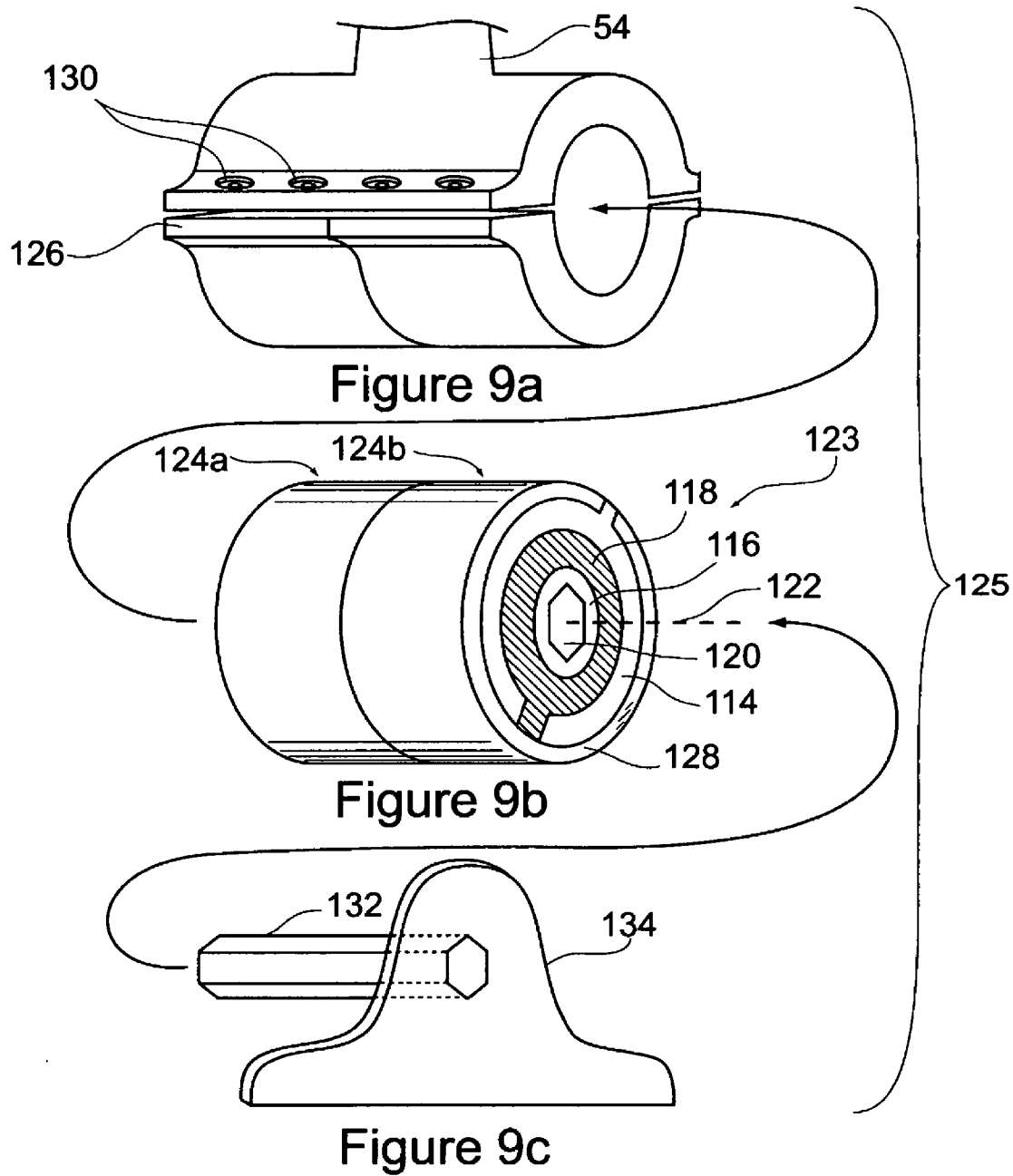

SNOW BIKE INCORPORATING A DOUBLE PIVOT SKI ASSEMBLY

RELATED APPLICATIONS

This application claims the benefit of priority of U.S. Provisional Patent Application No. 60/710,228, filed Aug. 22, 2005 entitled "Kit for Converting a Bicycle to a Snow Bike Incorporating a Double Pivot Ski Assembly".

FIELD OF THE INVENTION

This invention relates to a kit that can convert a bicycle to into a snow bike capable of traveling across snow-covered terrain. More specifically, it relates to a snow bike that incorporates a double pivot ski assembly for improved snow bike handling on extreme terrain.

BACKGROUND OF THE INVENTION

The terms "bicycle" and "bike" or "snow bicycle" and "snow bike" are used synonymously throughout this specification.

Attachments to convert a bicycle into a snow bicycle have been around since the 1800's. U.S. Pat. No. 556,350 to Hokanson et. al. shows replacement of the front wheel of a bicycle with a ski attachment to enable the bicycle to be used on ice and snow. Other patents, like U.S. Pat. No. 1,268,229 to Frank and U.S. Pat. No. 1,337,396 to Eiselt show methods of securing the ski attachment to the steering fork. These inventions also include the use of springs to provide for a resilient force to help keep the ski attachment from moving too much about the point of attachment to the bicycle. Other ski attachments show the use of pivot mechanisms between the point of attachment and the ski to improve performance. U.S. Pat. No. 6,416,062 to Scatchard shows a single pivot design, while U.S. Pat. No. 4,027,891 to Frame shows a double pivot design with the ski able to pivot along two axes that are perpendicular to each other. Still another pivot configuration is shown in U.S. Pat. No. 5,863,051 to Brenter. Here the pivot configuration is used to create a folding skibob.

Early ski attachments to bicycles were primarily for allowing the rider to move over snow on flat terrain. Today, however, biking and snow sports in general are becoming more extreme. Backwoods and terrain parks are standard environments in which to practice these sports. Riding over jumps, in half pipes and performing aerial maneuvers are common. A snow bike today therefore needs the ability to perform under these extreme conditions. Thus far the performance and handling of snow bikes and bike attachments that convert a conventional bike into a snow bike have not met the needs of the developing snow bike market.

SUMMARY OF THE INVENTION

One aspect of the present invention is directed to a kit for converting a conventional bike into a snow bike. The kit comprises an upper member, a lower member and a ski. The upper member is configured for attachment to the wheel dropouts of the bike. The upper and the lower member joined by a first pivot having a first rotation axis. The lower member and the ski joined by a second pivot having a second rotation axis. The first and second rotation axes parallel to the axis of the wheel dropouts.

Another aspect of the present invention is directed to a kit comprising an upper member, a lower member and a ski. The upper member is a steering column for the bike. The The upper member and the lower member joined by a first resilient pivot. The lower member and the ski joined by a second resilient pivot. The first and second pivots rotate about axes parallel to the axis of the wheel that is replaced.

BRIEF DESCRIPTION OF DRAWINGS

The foregoing and other aspects and advantages of the invention will be apparent from the following detailed description of the invention, as illustrated in the accompanying drawings, in which:

FIG. 4b is side view of the disc-plate in FIG. 4a;

FIG. 5a is a front side view showing the use of a rim-plate that attaches above the front wheel dropout of the steering fork and holds the lower part of the kit assembly to the bike;

FIG. 5b is a side view of the rim-plate attachment in FIG. 5a;

FIG. 6a is a front side view showing the use of fork clamps that attach above the front wheel dropout of the steering fork and hold the lower part of the kit assembly to the bike;

FIG. 6b is a side view of the fork clamp attachment in FIG. 6a;

FIG. 6c is a sectional view of the fork clamp in FIGS. 6a and 6b;

FIG. 9a is a perspective view of a casing attached to a first rigid member and capable of holding double torsion springs;

FIG. 9b is a perspective view of double torsion springs;

FIG. 9c is a perspective view of a pivot axle used to connect the double torsion spring assembly to a second rigid member;

FIG. 11b is a perspective view of a bar of flexible material used to create the joint in FIG. 11a;

FIG. 11c is a perspective view of two rods of flexible material used to create the joint in FIG. 11a;

DETAILED DESCRIPTION OF THE INVENTION

U.S. Pat. No. 6,416,062 to Brooke O. Scatchard, applicant of the current invention, provides supplemental information on a kit that can convert a bike to into a snow bike capable of traveling across snow-covered terrain and is herein incorporated by reference.

Figure 1:
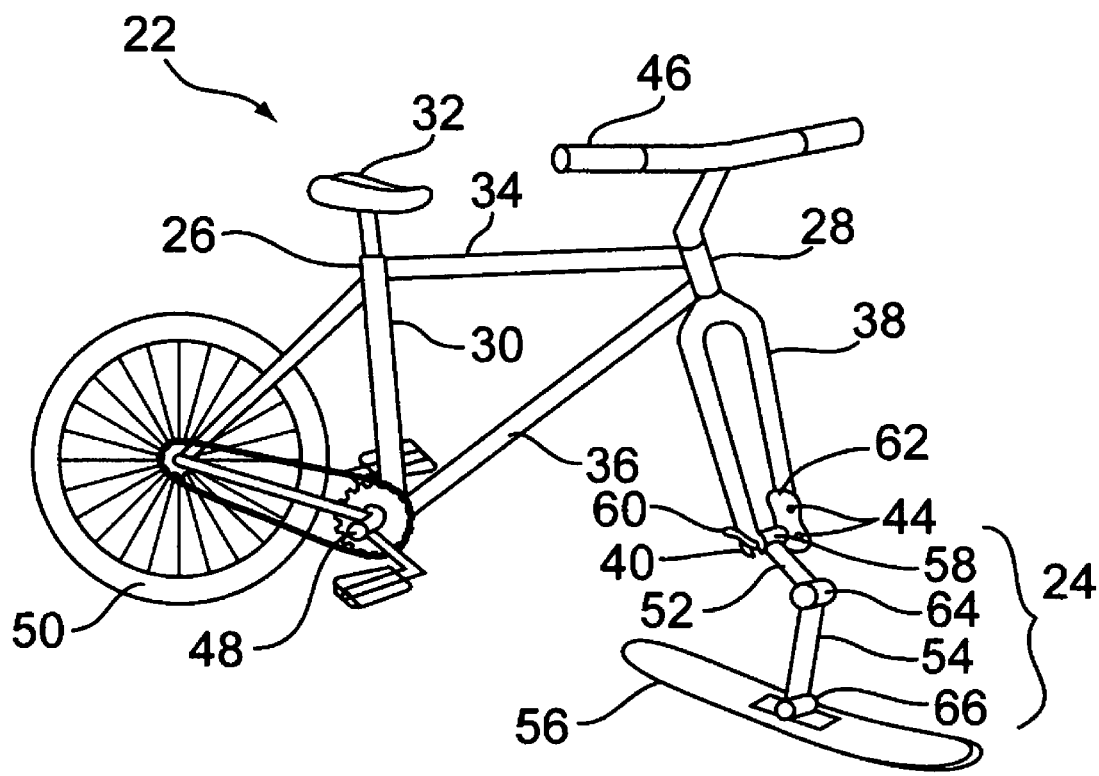
FIG. 1 is a perspective view of a conventional bike converted into a snow bike by replacing the front wheel with a double pivot ski kit assembly according to the present invention.
Figure 2:
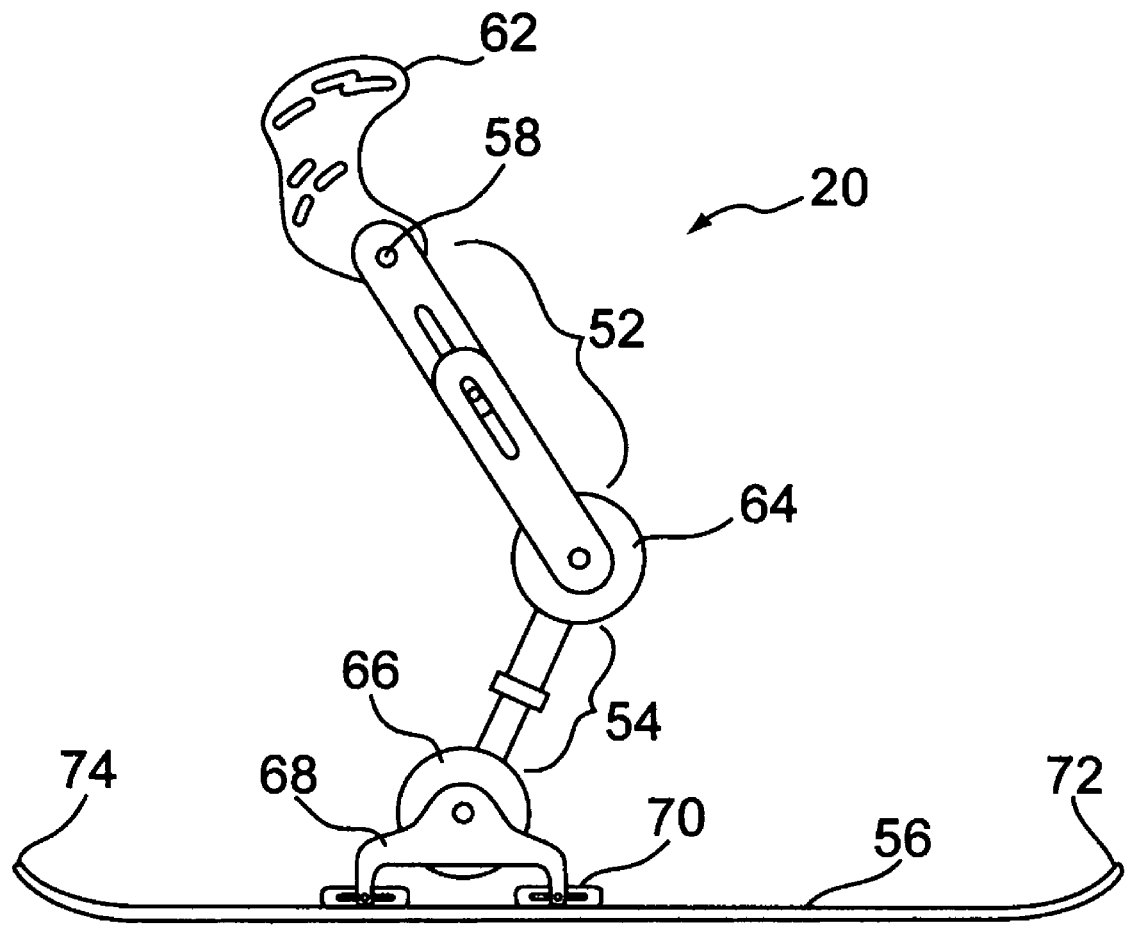
FIG. 2 is a side view of a ski kit assembly for converting a bicycle into a snow bike.
Figure 3:
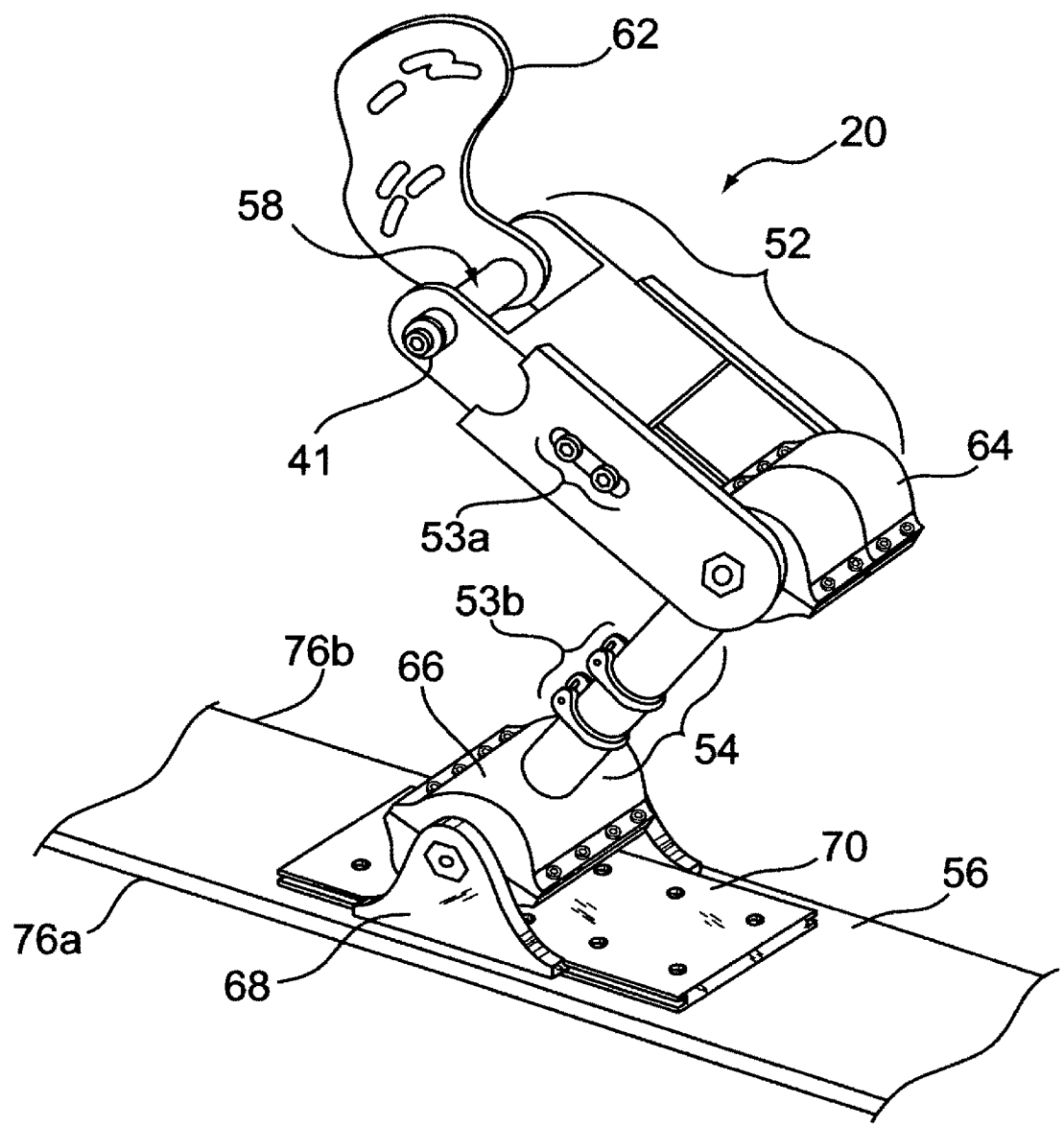
FIG. 3 is a perspective view of another embodiment of a ski kit assembly for converting a bicycle into a snow bike.

One embodiment of the present invention is illustrated in FIGS. 1-3 as kit 20 for converting a conventional bicycle to a snow bike 22. Kit 20 replaces the conventional front wheel of a bicycle with a ski assembly 24. Preferably the bicycle is of a type designed for off-road travel such as a mountain bike or the like. Such a bike 22 usually includes a frame 26 including a generally upright head tube 28. Head tube 28 is connected to seat tube 30 with seat 32 by a generally horizontal top tube 34 and sloping down tube 36. A front steering fork 38 is journaled to head tube 28 and has a pair of wheel dropouts 40 for receiving the front wheel of the bicycle. Wheel dropouts 40 and rim brake bosses 42 or disc brake tab(s) 44 provide mounting locations for kit 20 when the front wheel and front brake are removed or relocated. The upper end of the steering fork extends through the head tube and is attached to handle bars 46 for steering the bicycle. A pedal driven drive sytem 48 provides motive power to a rear wheel 50.

Prior to attaching kit 20 to bike 22, the front wheel is removed from bike 22 and the front brakes are removed (or relocated) from rim brake bosses 42 or disc brake tabs 44. The components of kit 20 include upper member 52, lower member 54 and a ski 56. Upper member 52 has a wheel dropout connector 41 for attachment to wheel dropouts 40 of bike 22. A traverse rod 58, which is an integral part of the upper end of upper member 52, is received into front wheel dropouts 40 of steering fork 38 of bike 22. A standard quick release mechanism 60 or 20-millimeter through axle may be used to releasably fix rod 58 in wheel dropouts 40. Upper member 52 with rod 58 may be machined, welded, extruded or molded from any number of light weight alloys or composites that are already used in bike frame fabrication. Upper member 52 may also be fabricated to be a set length or adjustable in length. For adjustable length, upper member 52 may include length adjustment mechanism 53a.

A plate 62 is used to rigidly secure upper member 52 to steering fork 38 of bike 22 by connecting to brake tabs on the steering fork. Depending on the type of steering fork 38 on bike 22, and whether it has disc brakes or rim brakes, other special plates and connectors may be used to secure upper member 52 to the steering fork.

Upper member 52 and lower member 54 are joined together by first pivot 64. Pivot 64 comprises a mechanism for generating a resilient force to resist rotation of the pivot. The rotation axis of first pivot 64 is located within the mechanism for generating the resilient force for that pivot. The mechanism for generating and adjusting the resiliency of pivot 64 is located between the lower end of upper member 52 and the upper end of lower member 54. Lower member 54 may also be fabricated to be a set length or adjustable in length. For adjustable length, lower member 54 may include length adjustment mechanism 53b. The lower end of lower member 54 is joined to ski 56 by second pivot 66. Pivot 66 comprises a mechanism for generating a resilient force to resist the rotation of the pivot. The rotation axis of second pivot 66 is located within the mechanism for generating the resilient force for that pivot. The mechanism for generating and adjusting the resiliency of pivot 66 is located between the lower end of lower member 54 and the top of ski 56. The resiliency of first pivot 64 and second pivot 66 are adjustable independently of each other. A system including a bracket 68 and rail 70 may be further used to adjustably connect second pivot 66 to ski 56. Preferably ski 56 is in similar construction to a stunt ski in that it has a relatively short footprint (as compared to a downhill ski) and has an upturned leading edge 72, an upturned trailing edge 74, and two generally parallel lateral edges 76a and 76b between the leading and trailing edges.

First pivot 64 and second pivot 66 both utilize a resilient mechanism to resist the rotation of the pivot from a predetermined resting position. One embodiment uses rubber torsion springs as the resilient pivot mechanism to provide this resistance. Both first pivot 64 and second pivot 66 can allow lower member 54 and ski 56 to rotate in either direction from their un-weighted, resting position. However, once either member rotates, the bias offered by the pivots urges the member back to the resting position of the pivots. The axis of rotation of both pivots is parallel to the axis of rotation of the wheel that originally fit within dropouts 40. This double pivot design provides several key features that enhance the performance of ski bike 22. First, having pivots 64 and 66 both rotate about axes parallel to the axis of wheel dropouts 40 provides lateral stability that allows lateral ski edges 76a and 76b to be utilized in turns. The resilient nature of pivots 64 and 66 and their resistance to movement from the rest position urge the ski to maintain a generally horizontal orientation when handlebar 46 is turned by exerting pressure on the portion of the lateral edge 76 of ski 56 that leads in the direction of the turn. This pressure on leading portion of the lateral edge 76 of ski 56 causes pivots 64 and 66 to rotate from the rest position in order to allow the remainder of the lateral ski edge 76 to stay in contact with the snow surface. The resilient pivot 64 and 66 also allow ski 56 to pitch about the pivots to conform to bumps on the snow surface. These characteristics provide the ski bike with stable and controllable handling on a variety of snow surfaces and inclines.

Figure 4A:
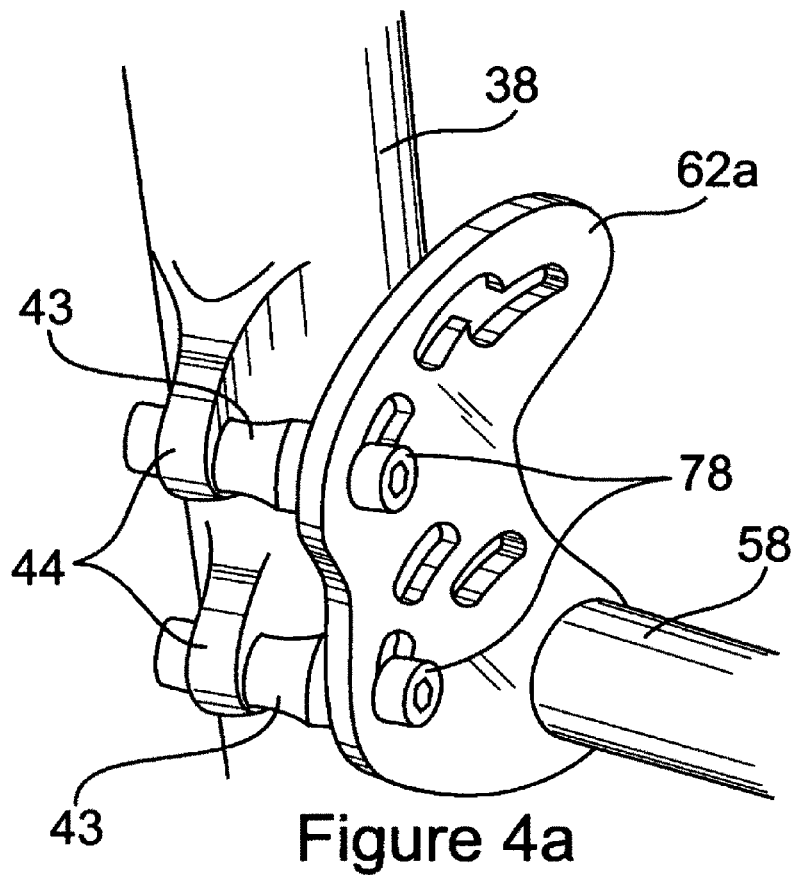
FIG. 4a is a perspective view showing the use of a disc-plate that attaches above the front wheel dropout of the steering fork and holds the lower part of the kit assembly rigidly to the bike.

Using another point above wheel dropouts 40 is key to rigidly hold ski assembly 24 in place and firmly anchor upper member 52 to bike 22. This can be done by using brake tabs and wheel dropouts 40 to attach upper member 52 to front steering fork 38. Different plates 62 can be used to secure ski assembly 24 to bike frame 26 depending on the type of brake tabs on steering fork 38. If steering fork 38 has disc brakes tabs 44, then a special disc plate 62a (as shown in FIG. 4a) can be used to secure upper member 52 to steering fork 38. Disc plate 62a is rigidly fixed to traverse rod 58 and is attached by brake tab connector 43 with screws 78 to disc brake tabs 44 on steering fork 38.

Figure 4B:
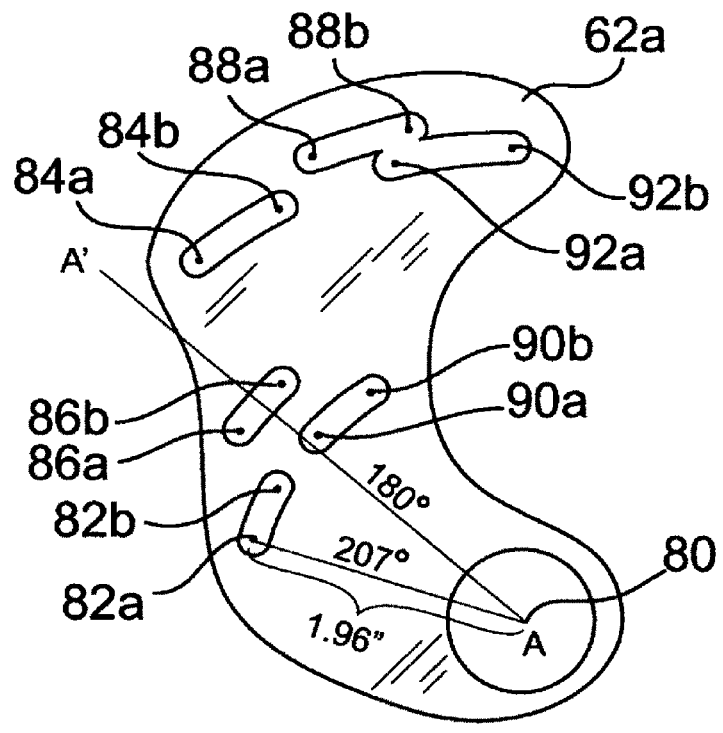

Disc plate 62a is slotted to allow rotation about dropouts 40 of the front wheel axle for geometry and angular orientation adjustment of upper member 52 relative to steering fork 38. FIG. 4b shows slotted disc plate 62a. The slotted holes have specific lengths and angular orientations relative to center point 80 of where disc plate 62a attaches to traverse rod 58. The three pairs of slots are positioned to align with the three most common orientations of disc brake tabs 44 on currently available mountain bike forks. The three pairs of slots are 82 and 84, 86 and 88, and 90 and 92. The slots are positioned so that upper member 52 may be rotated approximately 12 degrees about point 80.

The orientations and positions of these slots are as follows. Line A-A' defines a reference angle of 180° for the angular placement of the slots relative to point 80. The distance from 80 to 82a-b is 1.96" with angles relative to A-A' of 82a at 207° and 82b at 195°. The distance from 80 to 84a-b is 3.46" with angles relative to A-A' of 84a at 175° and 84b at 163°. The pair of slots 82 and 84 are positioned to align with all MARZOCCHi® forks. The distance from 80 to 86a-b is 2.40" with angles relative to A-A' of 86a at 187.5° and 86b at 177.5°. The distance from 80 to 88a-b is 3.65" with angles relative to A-A' of 88a at 158° and 88b at 148°. The pair of slots 86 and 88 are positioned to align with all ROCK SHOX® Boxer forks. The distance from 80 to 90a-b is 1.96" with angles relative to A-A' of 90a at 178° and 90b at 166°. The distance from 80 to 92a-b is 3.46" with angles relative to A-A' of 92a at 148° and 92b at 136°. The pair of slots 90 and 92 are positioned to align with all other ROCK SHOX® and similar forks.

If the steering fork 38 has rim brakes, then a rim plate 62b is used as shown in FIG. 5a and FIG. 5b. Rim plate 62b is rigidly attached to traverse rod 58 by a weld or similar connection. The plate then attaches to rim brake bosses 42 by screws 94a and 94b.

If steering fork 38 has neither rim brake bosses nor disc brake tabs, ski assembly 24 may be attached via fork plate 62c with fork clamps 96a and 96b as shown in FIG. 6a-c.

Figure 7A:
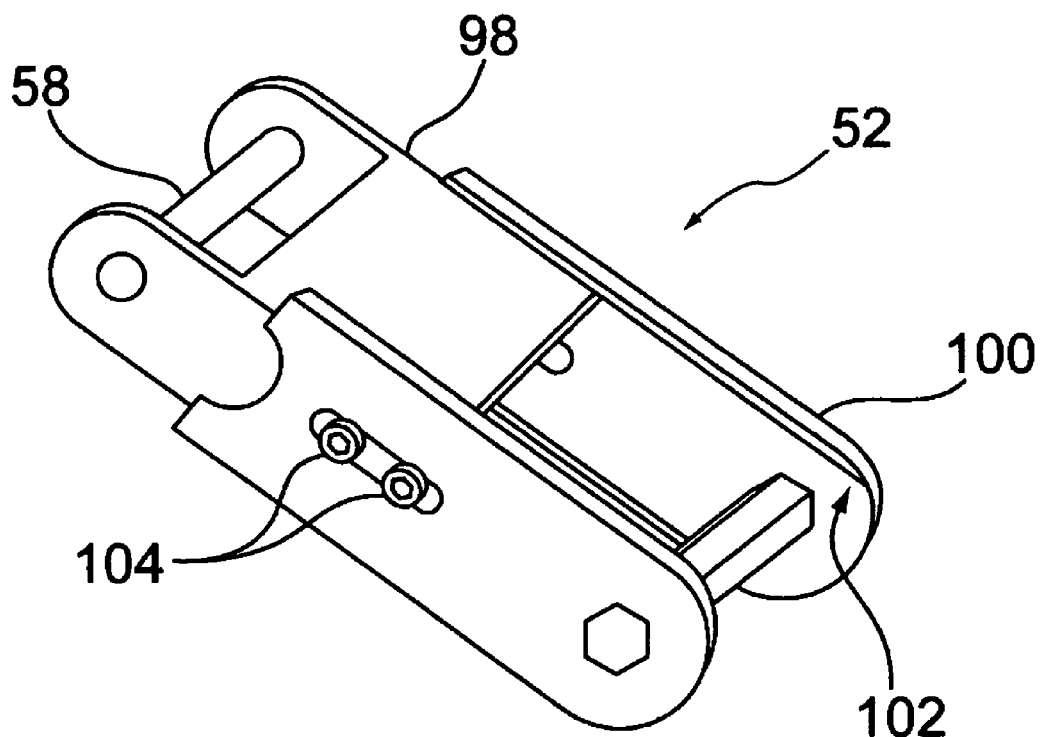
FIG. 7a is perspective view of one type of adjustable rigid member.
Figure 7B:
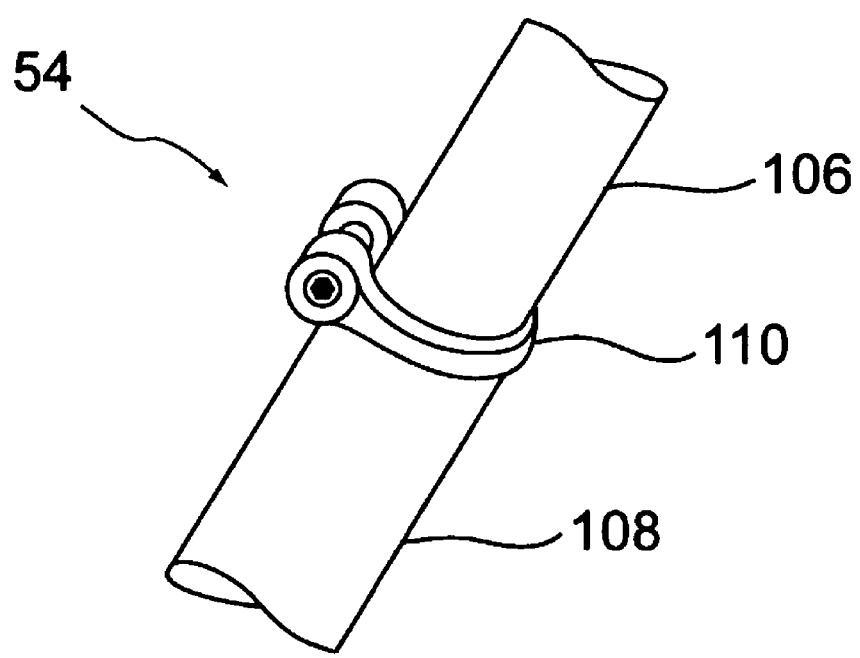
FIG. 7b is perspective view of another type of adjustable rigid member.

Both upper member 52 and lower member 54 may be fabricated to be adjustable in length. Various structures can be used to provide for adjustable length members. FIG. 7a and FIG. 7b show two variations of such adjustable members. FIG. 7a shows an adjustable upper member 52 that consists of a rectangular upper section 98 and a rectangular lower section 100. Upper section 98 glides within track 102 defined by lower section 100. The upper and lower sections slide relative to each other and the overall length of upper member 52 is determined by the relationship of the two sections relative to each other. Screws 104 are used to rigidly lock upper section 98 and lower section 100 to give a defined length to upper member 52.

FIG. 7b shows an adjustable lower member 54 that includes an upper tube 106 and a lower tube 108. Upper tube 106 has an outer diameter which is just slightly smaller than the inner diameter of lower tube 108. Upper tube 106 is able to slide within lower tube 108 to give a range of lengths for lower member 54. A locking clamp 110 is used to rigidly lock upper tube 106 and lower tube 108 together and set the length of lower member 54. Although two embodiments of adjustable members have been shown and described, it is well known to those skilled in the art that other adjustable member configurations exist without deviating from the spirit of this invention.

First pivot 64 and second pivot 66 both utilize some form of resilient mechanism to allow ski 56 to pitch about the pivots when handlebar 46 is turned and when traveling over bumps on the snow surface. The resilient pivots allow the ski to be deflected by these forces and urge it to return to a neutral position. As handlebar 46 is turned, the angle of head tube 28 and steering fork 38 cause lateral edge 76 of leading edge 72 of ski 56 to be forced downward into the snow surface. The resistance to deflection placed on ski 56 by resilient pivots 64 and 66 enables the ski to carve turns by engaging leading edge 72 and lateral edges 76 of the ski. Both pivots 64 and 66 can be rotated in either direction from their resting position. This allows the lateral edges 76a and 76b of ski 56 to remain in contact with the snow surface in turns and over bumps. Further, pivots 64 and 66 work together to create a shock absorbing mechanism that allows the ski to be deflected in a generally vertical direction to absorb large impacts. The resiliency of pivots 64 and 66 allows ski attachment 24 to react to these forces and urge ski 56 to maintain a maximum contact area with the snow to enable stable handling of snow bike 22.

Figure 8A:
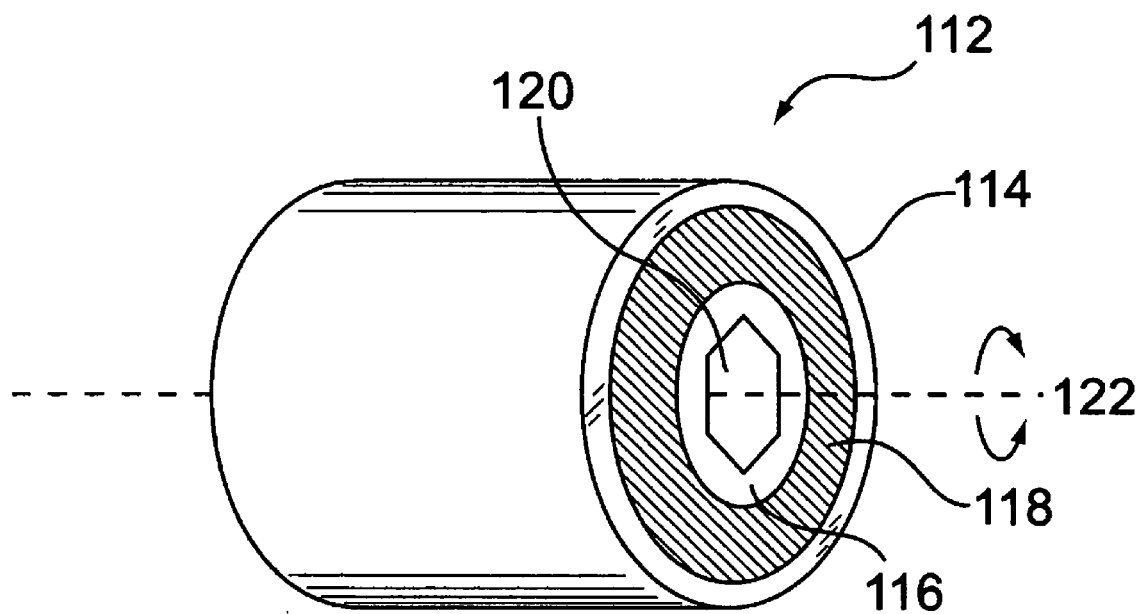
FIG. 8a is a perspective view of a single torsion spring.
Figure 8B:
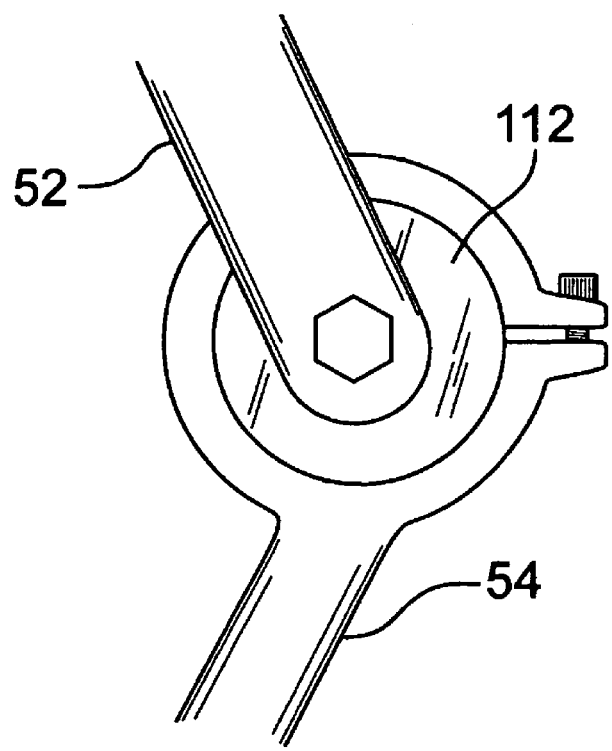
FIG. 8b is a side view of a single torsion spring connected to rigid members to create a resilient pivot joint.

One example of a resilient pivot is shown in FIG. 8a and FIG. 8b. Here a single torsion spring 112 is used to connect upper member 52 to lower member 54. Torsion spring 112 includes an outer rigid cladding 114, inner rigid core 116 and a resilient material 118 in between and bonded to both the outer cladding 114 and inner core 116. Inner core 116 has a through hole 120 that defines an axis of rotation 122. The thickness and stiffness of resilient material 118 define how much rotation can occur around axis of rotation 120 for a given applied force. Through hole 118 may take the shape of a hexagonal cylinder to accept a hexagonal rod from the lower end of upper member 52. The upper end of the lower member clamps around the torsion spring as shown in FIG. 8b.

Torsion spring 112 is one example of a mechanism for generating a resilient force for a pivot with the rotation axis of the pivot being located within this mechanism. The performance of single torsion spring pivot 112 described above is fixed by the thickness and stiffness of resilient material 118. This fixed performance of torsion spring 112 limits the performance of the ski assembly to that defined for a given rider's weight or type of terrain they plan to ride on. To have the ability to adjust the resiliency of the pivots used in kit 20 and provide for an adjustable performance in ski assembly 24, a double torsion spring pivot 123 design may be used. FIG. 9a-c shows the workings of a resiliency adjustment mechanism 125 having a double torsion spring pivot 123. Two torsion springs 124a and 124b are placed side by side within clamping mechanism 126 attached to the lower end of lower member 54. Both torsion springs 124a and 124b include an outer rigid cladding 114, inner rigid core 116 and a resilient material 118 between and bonded to the both outer cladding 114 and inner core 116. A slotted cylinder 128 surrounds outer rigid cladding 114 of each torsion spring 124 and acts to lock each torsion spring in place independently when tightened by screws 130 of clamping mechanism 126. Inner core 116 has a through hole 120 that defines an axis of rotation 122. Through hole 120 may take the shape of a hexagonal walled hole to accept a hexagonal rod 132 of bracket 134 that attaches to ski 56.

The resiliency of double torsion spring pivot 123 is adjusted by rotating torsion springs 124a and 124b in opposite directions around axis 122 to preload the double spring pivot system. When turned against each other, torsion springs 124a and 124b, having equal spring rates (aka stiffness), will rest at the position where both springs are deflected equally. The preloading of the torsion spring system is accomplished by tightening one pair of screws 130 of clamping mechanism 126 to clamp torsion spring 124a within slotted cylinder 128. Torsion spring 124b is placed on hexagonal rod 132 adjacent to the first spring 124a and within the un-tightened portion of the slotted cylinder 128. The hexagonal rod 132 is rotated an angular distance that is twice the desired resting position of the hexagonal rod. The second pair of screws 130 of clamping mechanism 126 are then tightened to hold spring 124b in this position. When hexagonal rod 132 is released from the previous rotation, springs 124a and 124b exert equal forces on each other and urge hexagonal rod 132 to maintain an angular location in which springs 124a and 124b are equally and oppositely rotated from their resting position. These opposing forces increase the stiffness of the double torsion spring pivot 123 by preloading springs 124a and 124b. The stiffness of the double torsion spring pivot 123 can be adjusted to accommodate for various rider weights or snow conditions by adjusting the rotation of springs 124a and 124b.

Figure 10A:
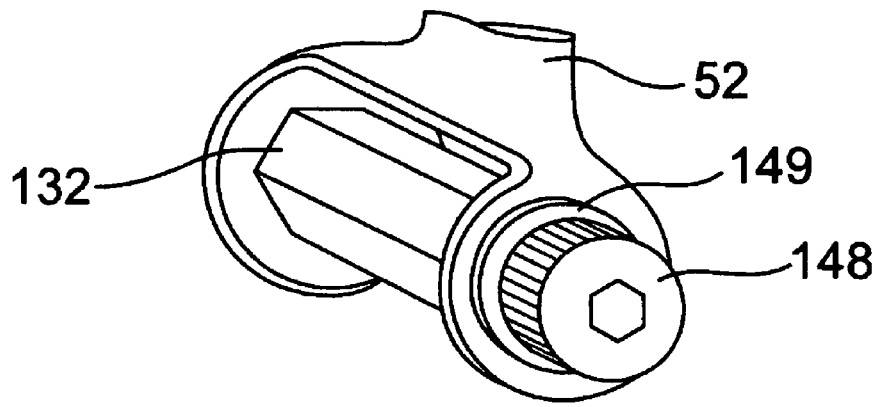
FIG. 10a is a perspective view of a fitting connected to a first rigid member and capable of holding a second type of double torsion spring assembly.
Figure 10B:
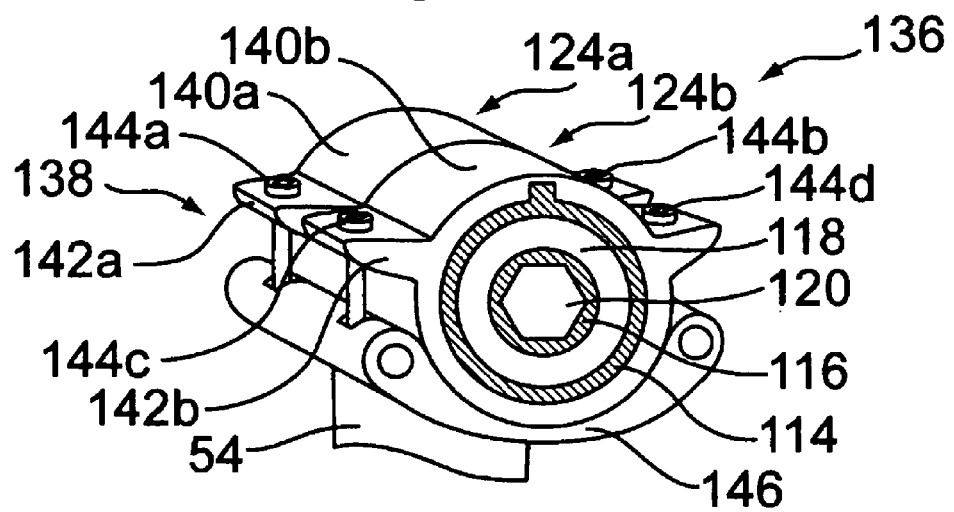
FIG. 10b is a perspective view of a second type of double torsion spring assembly in the un-tensioned state.
Figure 10C:
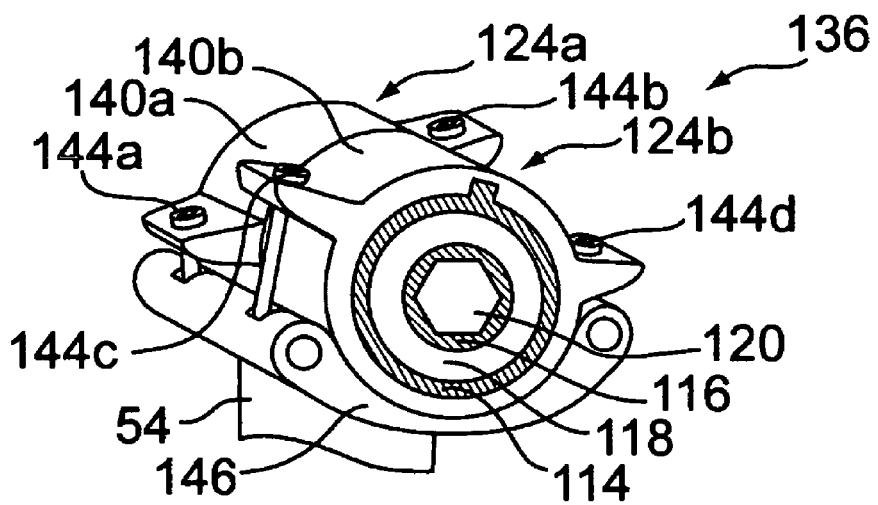
FIG. 10c is a perspective view of the double torsion springs shown in FIG. 10b now in a tensioned state.

An alternative embodiment of a double torsion spring pivot system 136 is shown in FIG. 10a-c. Here the torsion springs 124a and 124b are the same as in the previous embodiment, however, the manner in which each spring is held and the way the resiliency of the pivot system 136 is adjusted is different. Clamping mechanism 138 includes two slotted cylinders 140a and 140b that have wings 142a and 142b through which screws 144 may pass. Each slotted cylinder 140 rests within a trough defined by element 146. Element 146 is attached to lower member 54. Screws 144a and 144b screw through wings 142 into element 146. When assembling pivot system 136, member 52 is attached to torsion springs 124a and 124b by passing hexagonal rod 132 through hexagonal holes 120 of each torsion spring. Hexagonal rod 132 is bolted by bolt 148 and washer 149 to the lower end of upper member 52. The tension in each torsion spring 124 may be adjusted independently by adjusting how far each of the two screws on opposite sides of slotted cylinder 140 are tightened as shown in FIG. 10c. Tightening screw 144a and backing off on screw 144b rotates torsion spring 124a counter clockwise. Backing off on screws 144c and tightening screw 144d rotates torsion springs 124b clockwise. The stiffness or resiliency of the pivot system 136 can be adjusted by loading springs 124 in this manner. The angular orientation of lower member 54 and ski 56 may also be adjusted using pivot system 136.

Figure 11A:
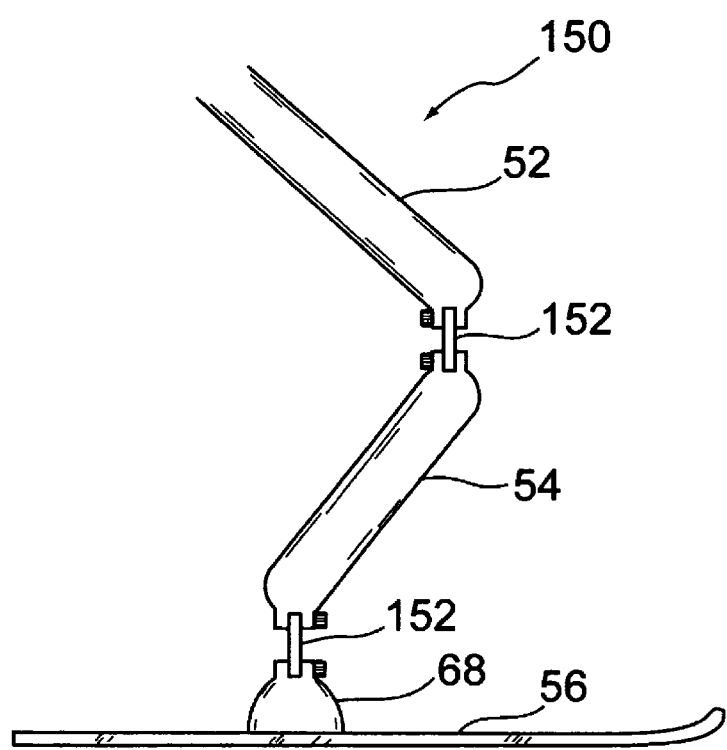
FIG. 11a is side view of an alternative embodiment of the present invention that incorporates flexible material to create the first and second pivot joints.
Figure 11B:
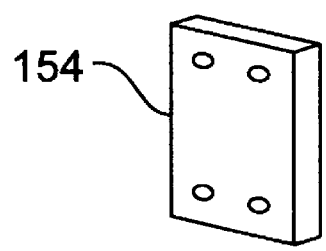
Figure 11C:
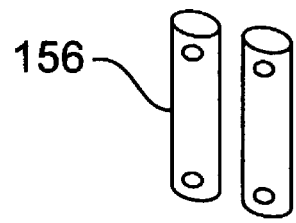

In another embodiment the torsion spring pivots described above may be substituted with a flexible material pivot arrangement 150 (aka leaf spring) as shown in FIG. 11a-c. Here upper member 52 and lower member 54 move substantially pivotably relative to each other by having a resilient material 152 incorporated between their ends. Resilient material 152 is another example of a mechanism for generating a resilient force for a pivot with the rotation axis of the pivot being located within this mechanism. Resilient material 152 maybe one or more rectangular bars 154 as shown in FIG. 11b or may be one or more rods 156 as shown in FIG. 11c. Typical materials for resilient material 152 may be fiberglass, carbon fiber, spring steel, or titanium. Similarly, a resilient material 152 may be incorporated between lower member 52 and bracket 68 that connects to ski 56. Resilient material 152 between upper member 52 and lower member 54 may have a different shape or different resilient properties than resilient material 152 between lower member 52 and bracket 68.

Figure 12:
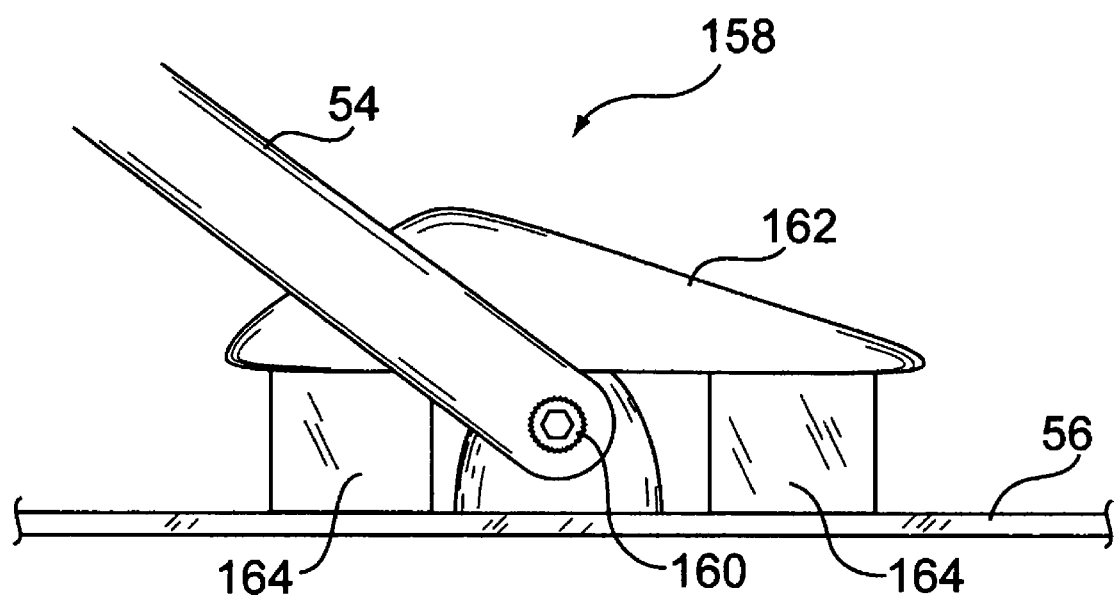
FIG. 12 is a side view of the use of rubber pads to create a pivot joint.

In yet another embodiment, resilient pivot 158 may be created using rubber pads as shown in FIG. 12. In this embodiment lower member 54 is connected to a rotating rod 160 and a rigid plate 162. Two rubber pads 164 are placed between the rigid plate 162 and ski 56. As a force is applied through the ski assembly, lower member 54 rocks around rotating rod 160 and rubber pads 164 to provide a resilient force that generates a resilient pivot action.

The geometry of the ski attachment can be altered by changing the length of upper member 52, the length of lower member 54 and adjusting the resting orientation of each resilient pivot mechanism. These changes may be used to adjust the height of ski assembly 24 to accommodate for bikes with various diameter wheels and tires or to alter the handling characteristics of ski bike 22. In a preferred embodiment, the location of first pivot 64 is in front of wheel dropouts 40 and second pivot 66. It should be obvious to those skilled in the art that first pivot 64 may also be located behind wheel dropouts 40 and second pivot 66 while still performing as described above.

Figure 13:
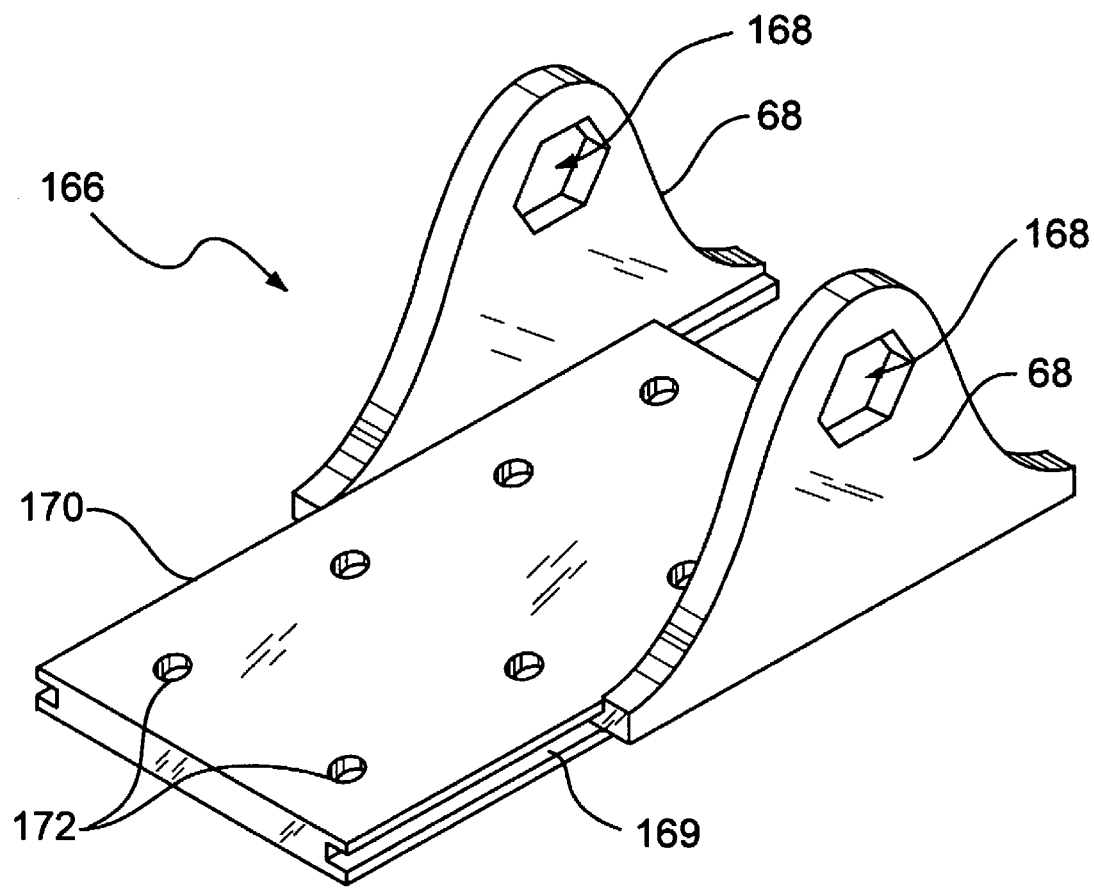
FIG. 13 is a perspective view of an adjustable rail that allows positioning of the upper portion of a ski kit assembly relative to the ski.

A bracket and rail system 166 as shown in FIG. 13 maybe employed between second pivot 66 and ski 56. Bracket 68 attaches by openings 168 to hexagonal rod 132 running through the center of second pivot 66. Bracket 68 is able to move along groove 169 and be fixed in place along rail plate 170. Rail plate 170 has pairs of holes 172 through which screws may be screwed in to attach bracket 68 and rail system 166 to ski 56.

The preferred ski 56 for a snow bike is similar to a stunt ski. Stunt skis are generally about 30" long and 4" wide with upturned leading 72 and trailing edge 74. Lateral edges 76 are concave towards the center of ski 56, creating an hourglass shape that enables the ski to carve a smooth radius turn when the ski is tilted onto either of the lateral edges. The leaning of snow bike 22 and turning of handlebar 46 by the rider cause ski 56 to be tilted onto one of the lateral edges to carve a turn. The preferred embodiment uses at least two pairs of threaded metal inserts in ski 56 to attach the rail plate 170 to the ski.

Figure 14:
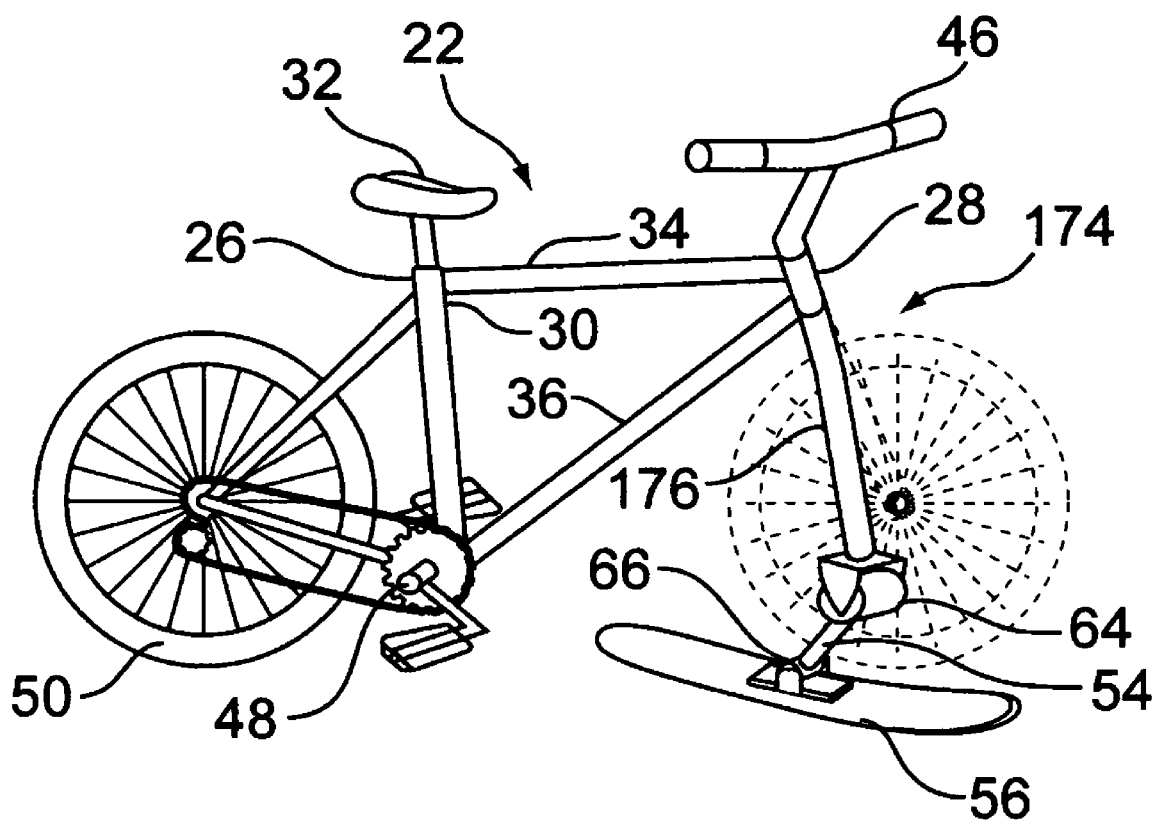
FIG. 14 is a perspective view of another embodiment of a snow bike incorporating a double pivot ski assembly kit.

Still another embodiment of the present invention is illustrated in FIG. 14. Here kit 174 replaces the steering fork and wheel of a conventional bike with a modified steering column 176 and associated ski assembly. Such a bike 22 includes a frame 26 including a generally upright head tube 28. Head tube 28 is connected to seat tube 30 with seat 32 by a generally horizontal top tube 34 and sloping down tube 36. A front steering column 176 is journaled to head tube 28. The upper end of the steering column 176 extends through the head tube and is attached to the handle bars 46 for steering the bicycle. A pedal driven drive sytem 48 provides motive power to a rear wheel 50. The dashed outline in FIG. 14 depicts the steering fork and front wheel that have been replaced. Steering column 176 is elongated relative to the original steering fork. The lower end of steering column 176 is joined to the upper end of lower member 54 by first resilient pivot 64. The lower end of lower member 54 is joined to ski 56 by second pivot 66. The overall height of kit 174 remains similar to the height of the steering fork and wheel combination that it replaced.

While several embodiments of the invention, together with modifications thereof, have been described in detail herein and illustrated in the accompanying drawings, it will be evident that various further modifications are possible without departing from the scope of the invention. For example, for improved traction, the rear wheel of the bike can be replaced with a wide studded tire inflated with low pressure. An endless loop track could also be used instead of a rear wheel for even more traction. Further, an endless loop track with skis on either side could be attached to replace the rear wheel. Nothing in the above specification is intended to limit the invention more narrowly than the appended claims. The examples given are intended only to be illustrative rather than exclusive.

What is claimed is:

1. A kit for converting a bike with wheel dropouts into a snow bike, comprising:
a ski assembly including an upper member, a lower member and a ski; said upper member having a wheel dropout connector and a brake tab connector; said upper member and said lower member joined by a first pivot having a first rotation axis; said lower member and said ski joined by a second pivot having a second rotation axis; said upper member mounts to said bike over a range of annular orientations around an axis parallel to the wheel dropouts when locked by said wheel dropout connector and said brake tab connector at an angle within said range of angular orientations; and at least one from the group including said first pivot and said second pivot having a resiliency adjustment mechanism.

2. A kit according to claim 1, wherein said first and second pivots are resilient pivots.

3. A kit according to claim 2, wherein the resiliency of said first pivot is adjustable independently of the resiliency of said second pivot.

4. A kit according to claim 1, wherein said first and second pivots are at least one from the group including a torsion spring, leaf spring and a pair of compressed rubber pads.

5. A kit according to claim 1, wherein said first and second pivots each rotate in both directions from a rest position.

6. A kit according to claim 1, wherein the length of said upper member and said lower member are independently adjustable.

7. A kit according to claim 1, wherein the resting angle between said lower member and said upper member is adjustable.

8. A kit according to claim 1, wherein the resting angle between said ski and said lower member is adjustable.

9. A kit according to claim 1, wherein said upper member further includes a plate extending upward from said upper member and wherein said plate includes a slot that creates said range of angular orientations.

10. A kit according to claim 9, wherein said plate connects said brake tab connector and said upper member.

11. A kit according to claim 1, wherein said upper member is attached to the wheel dropouts by a quick release mechanism.

12. A kit according to claim 1, wherein the location at which said second pivot joins said ski and said lower member is adjustable along the length of said ski.

13. A kit according to claim 1, wherein when a compressive force is applied perpendicular to the axis of the wheel dropout and through the base of said ski said first pivot and said second pivot rotate to dampen said force.

14. A kit according to claim 1, wherein when said kit is attached to said bike, said first and second rotation axes are parallel to the axis of the wheel dropouts.

15. A kit according to claim 1, wherein said resiliency adjustment mechanism includes a double torsion spring pivot.

16. A kit according to claim 15, wherein each torsion spring of said double torsion spring pivot rotates and locks to adjust the resiliency of said double torsion spring pivot.

17. A kit according to claim 1, wherein said ski assembly mounts to said bike over a range of angular orientations around an axis parallel to the wheel dropouts when locked by said wheel dropout connector and said brake tab connector at an angle within said range of angular orientations.

18. A kit according to claim 17, wherein said upper member further includes a plate extending upward from said upper member and wherein said plate includes a plurality of slots that create said range of angular orientations.

* * * * *